United States Patent
Lin et al.

(10) Patent No.: US 11,673,300 B2
(45) Date of Patent: Jun. 13, 2023

(54) FOAM AND METHOD OF FORMING FOAM

(71) Applicant: NIKE, Inc., Beaverton, OR (US)

(72) Inventors: To-Chun Lin, Beaverton, OR (US);
Hsiang-Wei Huang, Douliu (TW);
Jian-Cing Jhou, Douliu (TW);
Ying-Che Lai, Douliu (TW)

(73) Assignee: NIKE, Inc., Beaverton, OR (US)

( * ) Notice: Subject to any disclaimer, the term of this patent is extended or adjusted under 35 U.S.C. 154(b) by 920 days.

(21) Appl. No.: 16/364,256

(22) Filed: Mar. 26, 2019

(65) Prior Publication Data

US 2019/0299501 A1 Oct. 3, 2019

Related U.S. Application Data

(60) Provisional application No. 62/650,191, filed on Mar. 29, 2018.

(51) Int. Cl.
| | |
|---|---|
| *B29C 44/00* | (2006.01) |
| *B29C 44/12* | (2006.01) |
| *A43B 13/02* | (2022.01) |
| *B29C 44/34* | (2006.01) |
| *B29D 35/12* | (2010.01) |
| *B29C 44/58* | (2006.01) |

(Continued)

(52) U.S. Cl.
CPC ........ *B29C 44/1204* (2013.01); *A43B 13/023* (2013.01); *B29C 44/1219* (2013.01); *B29C 44/1285* (2013.01); *B29C 44/3415* (2013.01); *B29C 44/3423* (2013.01); *B29C 44/355* (2013.01); *B29C 44/586* (2013.01); *B29D 35/122* (2013.01); *B29D 35/142* (2013.01); *B29K 2105/04* (2013.01); *B29L 2031/504* (2013.01)

(58) Field of Classification Search
None
See application file for complete search history.

(56) References Cited

U.S. PATENT DOCUMENTS

| | | | |
|---|---|---|---|
| 2009/0094858 | A1 | 4/2009 | Ungari et al. |
| 2017/0305046 | A1 | 10/2017 | Fujisawa et al. |

(Continued)

FOREIGN PATENT DOCUMENTS

| | | | |
|---|---|---|---|
| CN | 107001679 A | | 8/2017 |
| CN | 107310086 A | | 11/2017 |

(Continued)

OTHER PUBLICATIONS

Rodriguez ES2388083A1 English Translation 2012 (Year: 2012).*

(Continued)

*Primary Examiner* — Jacob T Minskey
*Assistant Examiner* — Adrien J Bernard
(74) *Attorney, Agent, or Firm* — Honigman LLP; Matthew H. Szalach; Jonathan P. O'Brien

(57) ABSTRACT

A method for making a foam component is provided and includes inserting a foam material into a cavity of a mold having a top plate and a bottom plate, heating the foam material to cause the foam material to expand, and moving one of the top plate and the bottom plate relative to the other of the top plate and the bottom plate as the foam material expands and contacts the one of the top plate and the bottom plate to cause the foam material to fold over on itself within the cavity.

20 Claims, 9 Drawing Sheets

(51) Int. Cl.
    *B29D 35/14*     (2010.01)
    *B29K 105/04*     (2006.01)
    *B29L 31/50*     (2006.01)

(56) References Cited

U.S. PATENT DOCUMENTS

2018/0273715 A1*   9/2018  Luo .................. C08J 9/0061
2019/0381706 A1*  12/2019  Skinner ............. B29C 44/58

FOREIGN PATENT DOCUMENTS

ES         2388083 A1 *  10/2012  ............. B29C 43/00
WO   WO-2014009579 A1   1/2014

OTHER PUBLICATIONS

European Patent Office as ISA, International Search Report and Written Opinion for International Application No. PCT/US2019/024032, dated Jun. 28, 2019.
China National Intellectual Property Administration, First Office Action for application No. 201980023602.X dated Aug. 20, 2021.

\* cited by examiner

FOAM AND METHOD OF FORMING FOAM

CROSS REFERENCE TO RELATED APPLICATION

This application claims priority to U.S. Provisional Application No. 62/650,191, filed Mar. 29, 2018, the contents of which are incorporated by reference in their entirety.

FIELD

The present disclosure relates generally to foam and a method of forming foam.

BACKGROUND

This section provides background information related to the present disclosure which is not necessarily prior art.

Foam is widely used in consumer products such as footwear to provide a user with a degree of comfort and support during use. Such foam is typically inserted into a mold cavity as a sheet, in liquid form, or as pellets and is subjected to heat, thereby causing the foam to take the shape of the mold. Once formed, the foam is removed from the mold and is permitted to expand until the foam cools and takes the shape of the final product. Once cooled, the foam product may be incorporated into an article of footwear, for example.

While conventional processes for forming foam adequately provide a resulting foam structure capable of providing a degree of cushioning and support during use, such conventional structures may not provide optimal performance in certain implementations.

DRAWINGS

The drawings described herein are for illustrative purposes only of selected configurations and not all possible implementations, and are not intended to limit the scope of the present disclosure.

Figure 2:
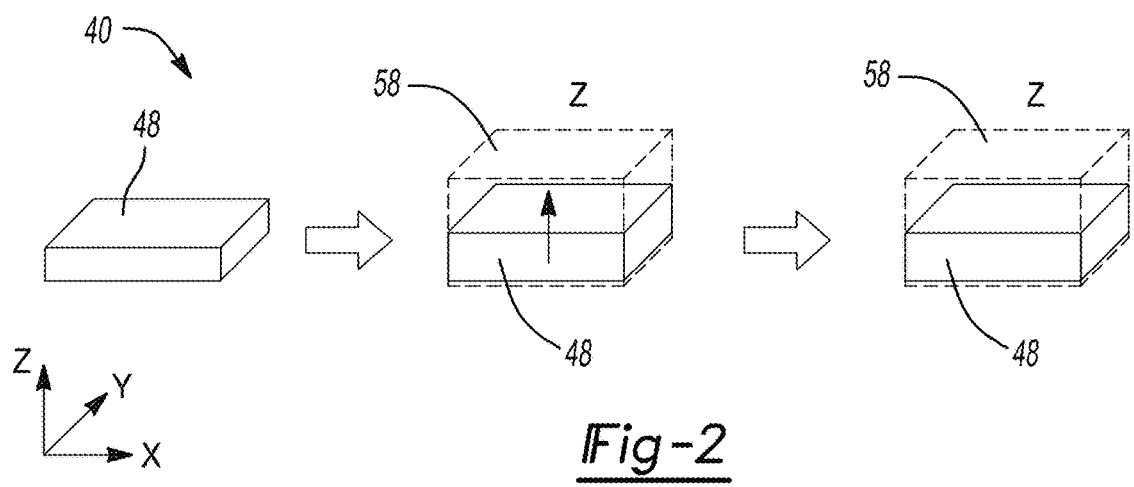
FIG. 2 is a schematic representation of a foam molding method in accordance with the principles of the present disclosure.
Figure 6:
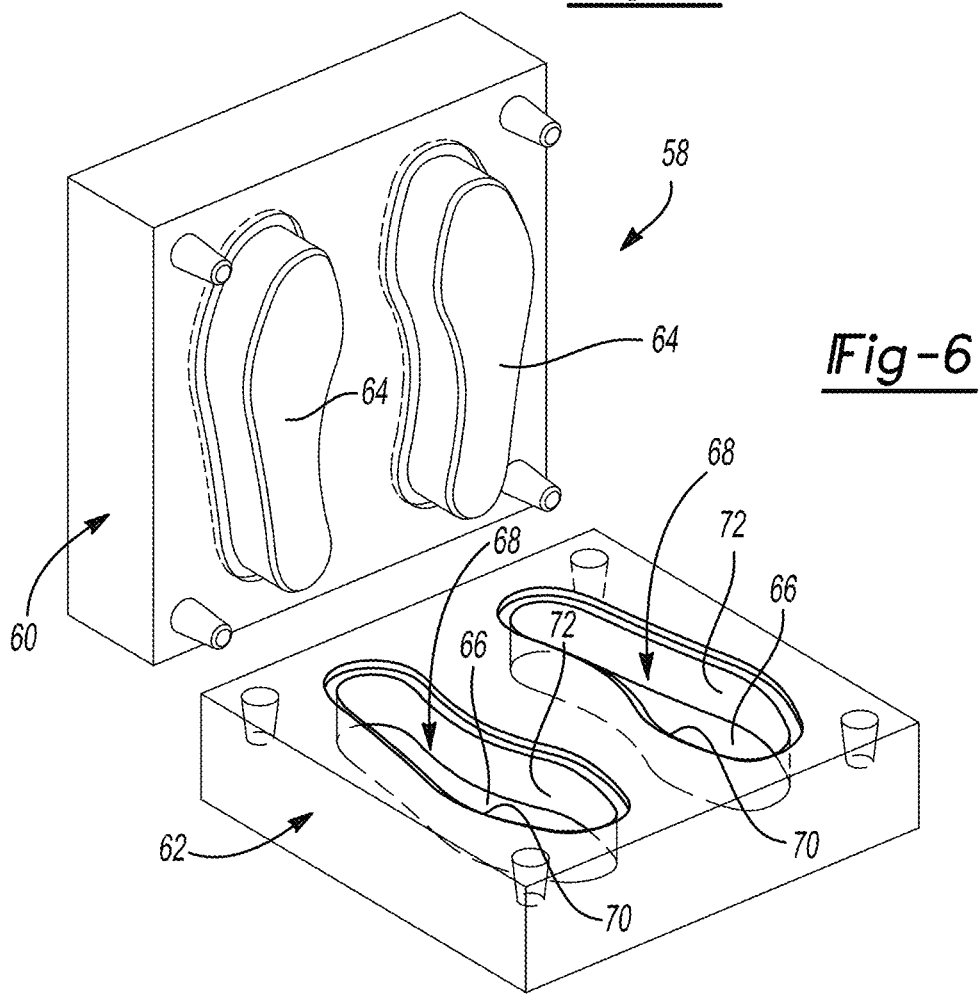
FIG. 6 is a perspective view of a mold for use with the method of FIG. 2 showing an empty cavity of the mold.
Figure 8:
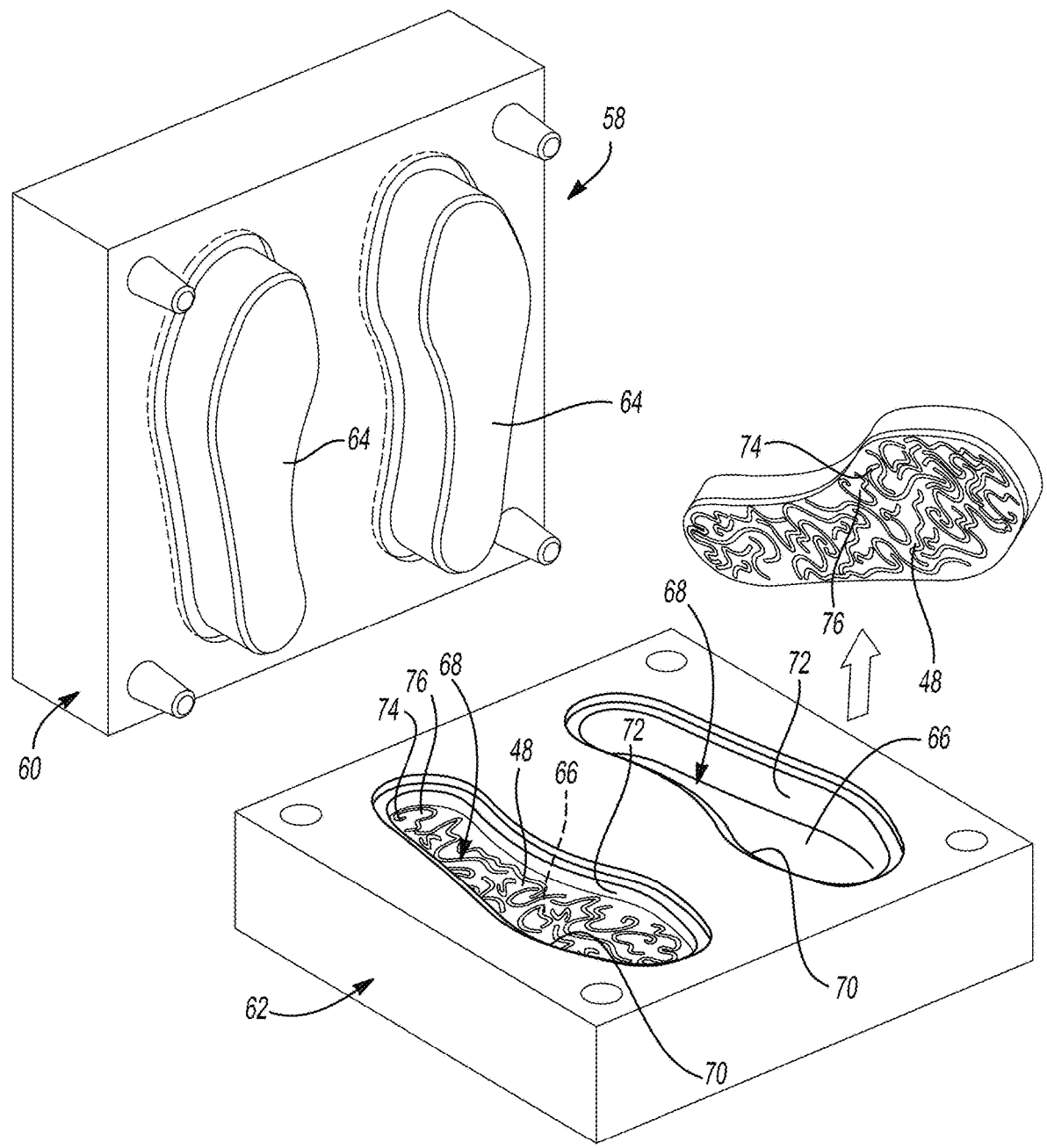
Figure 9:
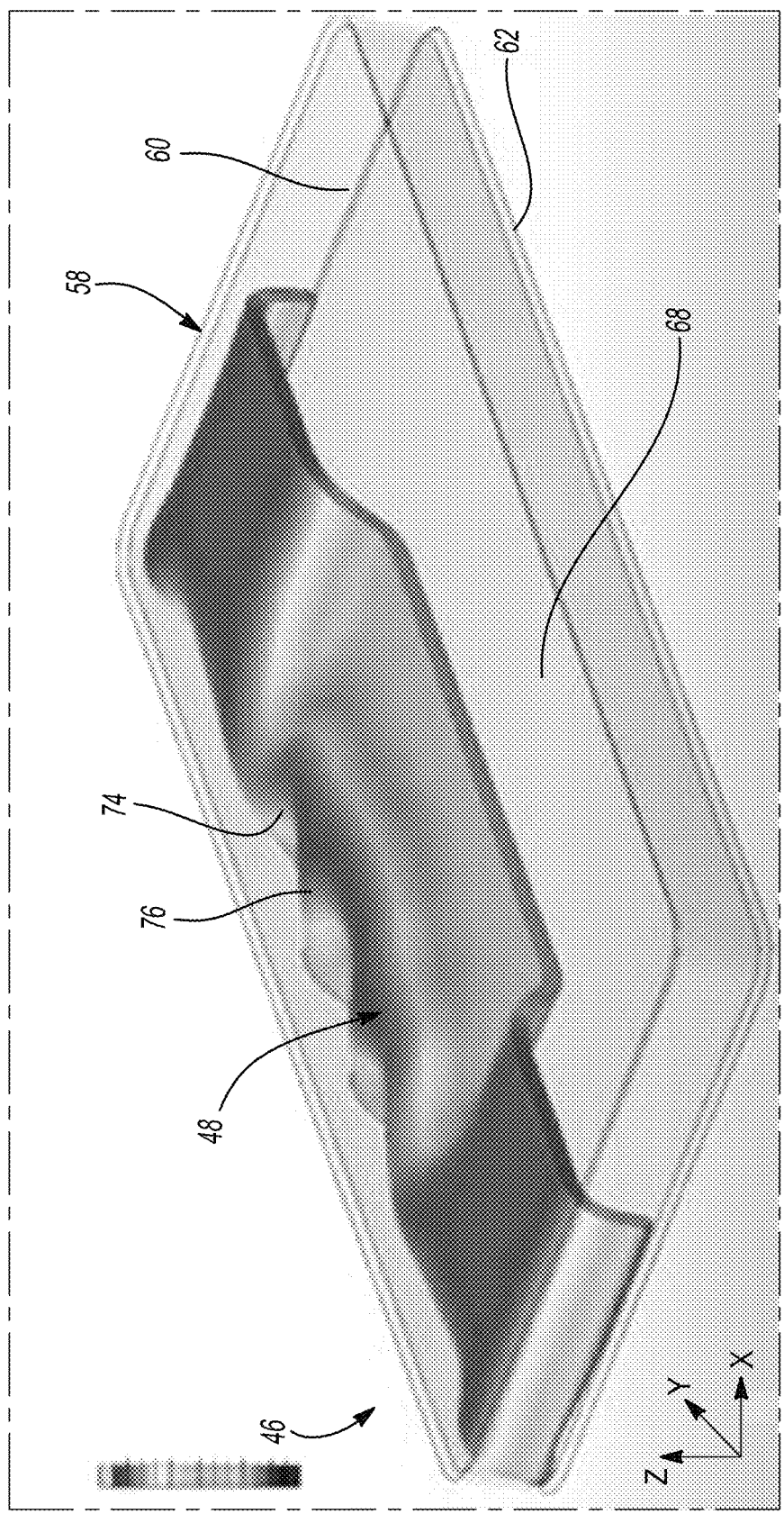
Figure 10A:
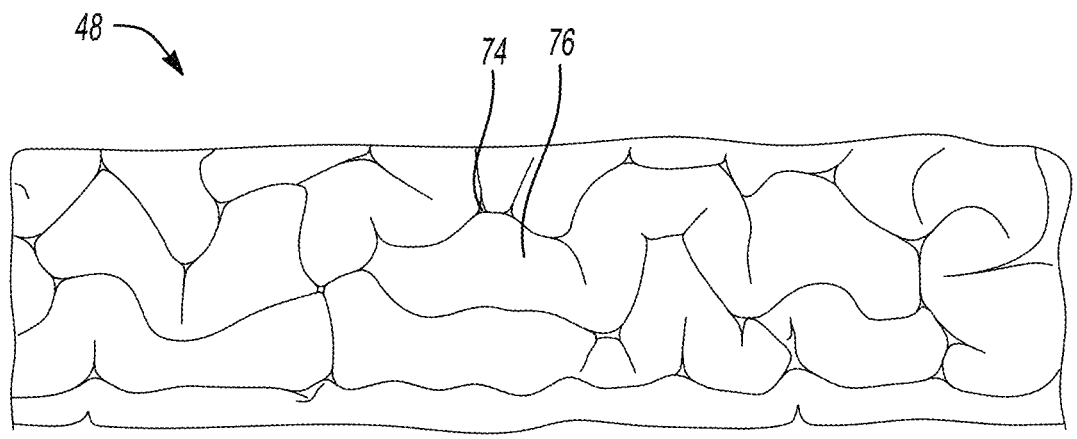
Figure 10B:
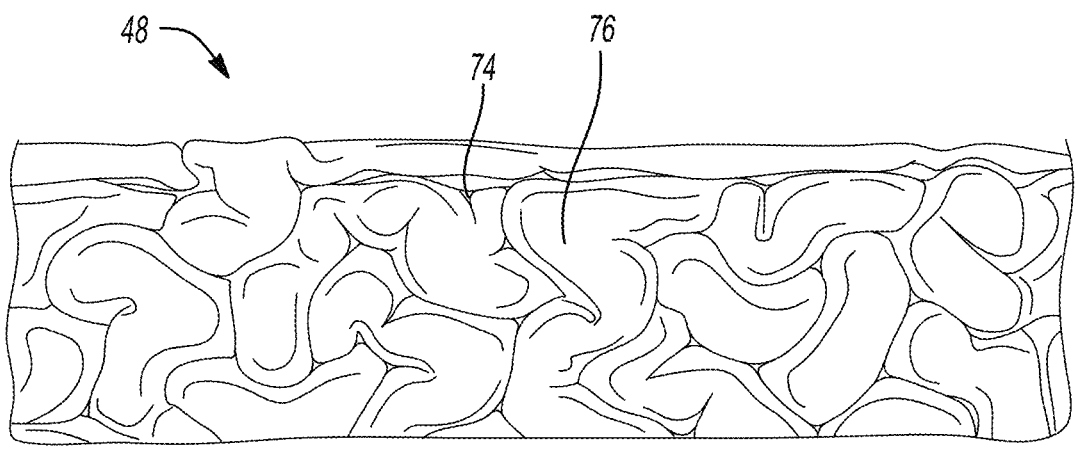

FIG. 8 provides an exemplary foam component formed using the method of FIG. 2 and the mold of FIG. 6;

FIG. 9 provides a schematic illustration of foam expanding and folding within a mold;

FIG. 10A provides a side view of a foam structure formed using the method of FIG. 2; and FIG. 10B provides a side view of another foam structure formed using the method of FIG. 2.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In one configuration, a method for making a foam component is provided and includes inserting a foam material into a cavity of a mold having a top plate and a bottom plate, heating the foam material to cause the foam material to expand, and moving one of the top plate and the bottom plate relative to the other of the top plate and the bottom plate as the foam material expands and contacts the one of the top plate and the bottom plate to cause the foam material to fold over on itself within the cavity.

In another configuration, the method includes curing the formed component to define a plurality of folds in the formed component, the plurality of folds being substantially non-uniform relative to one another.

In one configuration, inserting a foam material into the cavity includes inserting at least one of a foam sheet, foam pellets, and liquid foam. Inserting a foam material into the cavity may additionally include inserting a preform of the foam material having a thickness between approximately 0.5 mm and 3.5 mm. For example, the foam material may have a thickness of approximately 2 mm.

Expanding the foam material to form a formed component may include forming a formed component having a thickness between approximately 8.5 mm and 11.5 mm. For example, the formed component may have a thickness of approximately 10 mm.

The method may include utilizing an expansion ratio between approximately 1 and 5. For example, the expansion ratio may be between approximately 1.65 and 1.75.

Further areas of applicability will become apparent from the description provided herein. The description and specific examples in this summary are intended for purposes of illustration only and are not intended to limit the scope of the present disclosure.

Figure 1:
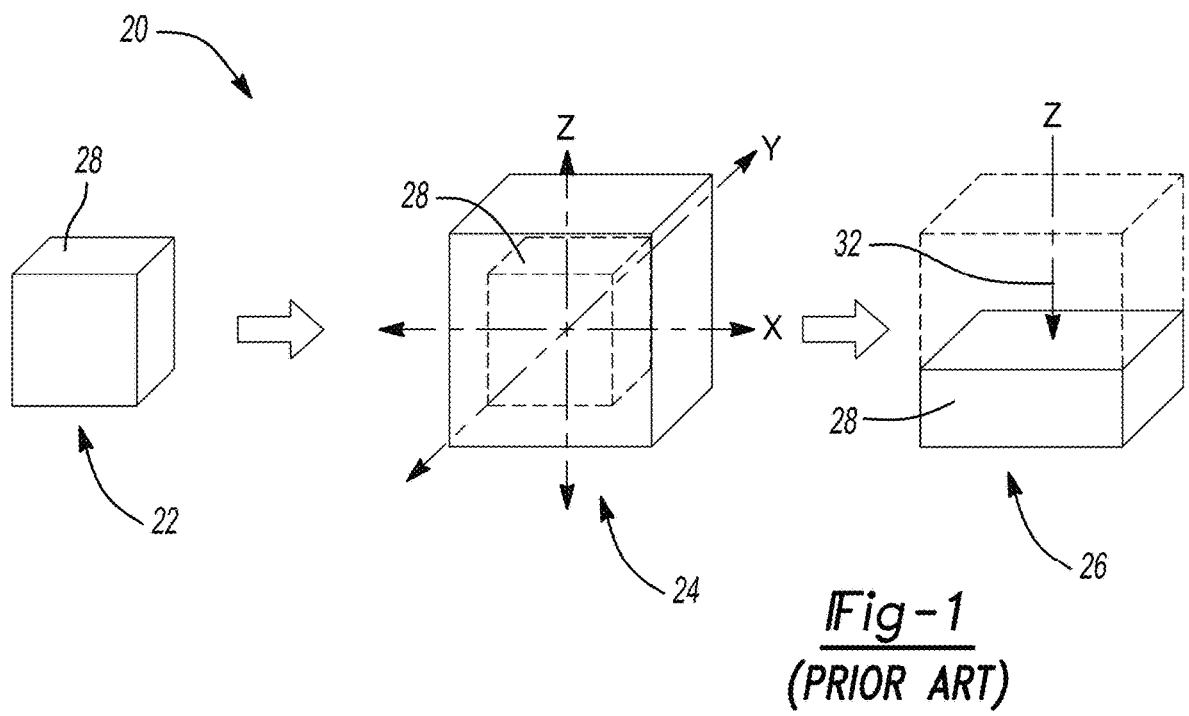
FIG. 1 is a schematic representation of a prior art foam molding method.

With reference to FIG. 1, a schematic representation of a prior art foam molding method 20 is generally shown. The method 20 may include a first stage 22, a second stage 24, and a third stage 26. At the first stage 22, a foam material 28 may be inserted into a cavity of a mold (not shown) where the foam material 28 is subjected to heat and generally takes the shape of the mold. At the second stage 24, the formed, foam material 28 is removed from the cavity and expands outside of the mold along an X-axis, a Y-axis, and a Z-axis, thus, increasing the volume of the foam material 28. At the third stage 26, a compressive force 32 may be applied to the expanded, foam material 28 along the Z-axis (i.e., the compressive force 32 may be in a generally downward direction), thereby decreasing the volume of the foam material 28.

With reference to FIGS. 2-11, a method 40 for forming a foam component such as a cushioning element of an article of footwear is provided. The cushioning element may be an outsole, a midsole, or an insole and may be incorporated into an article of footwear (not shown) following formation of the foam component.

Figure 3:
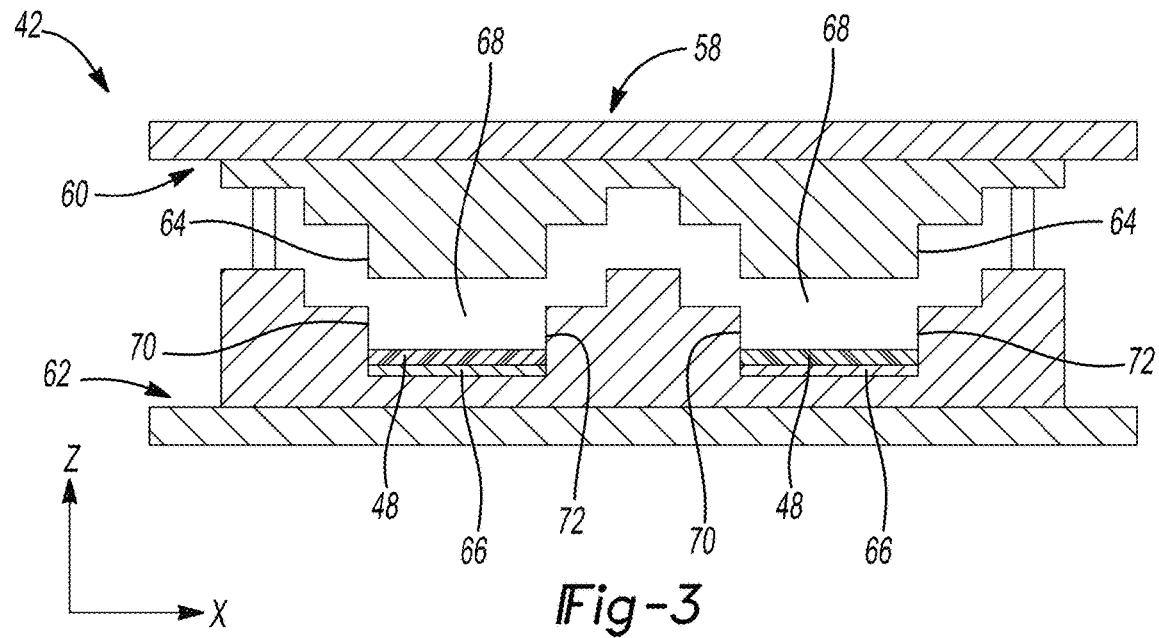
FIG. 3 is a schematic representation of a mold in accordance with the principles of the present disclosure for use with the method of FIG. 2 and shown in a first position.
Figure 4:
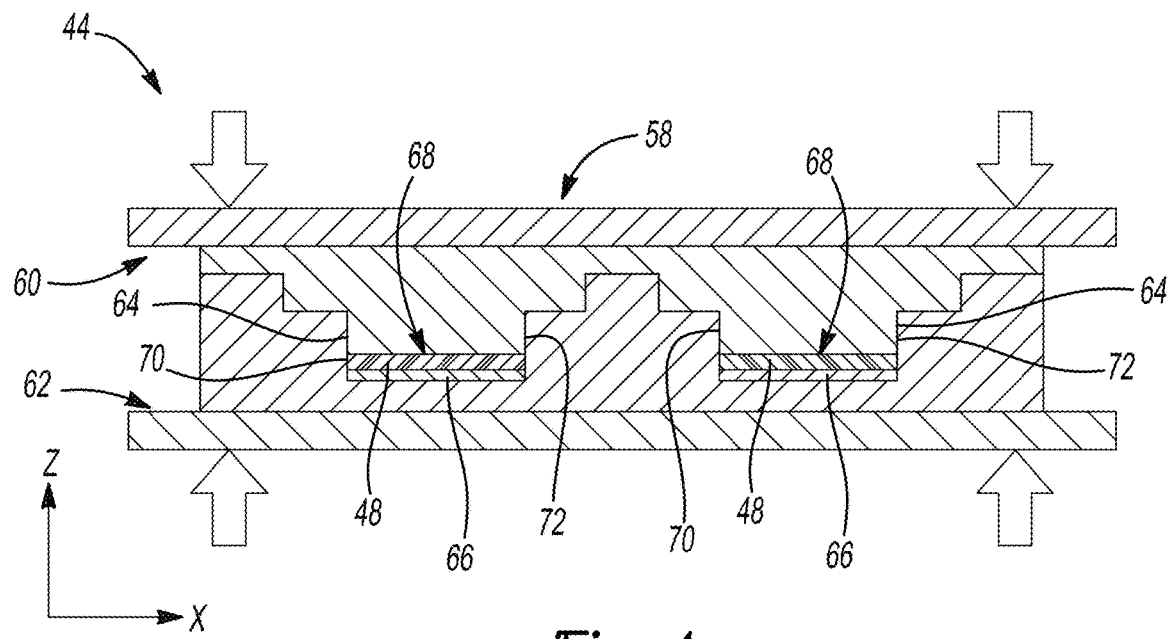
FIG. 4 is a schematic representation of the mold of FIG. 3 in a second position.
Figure 5:
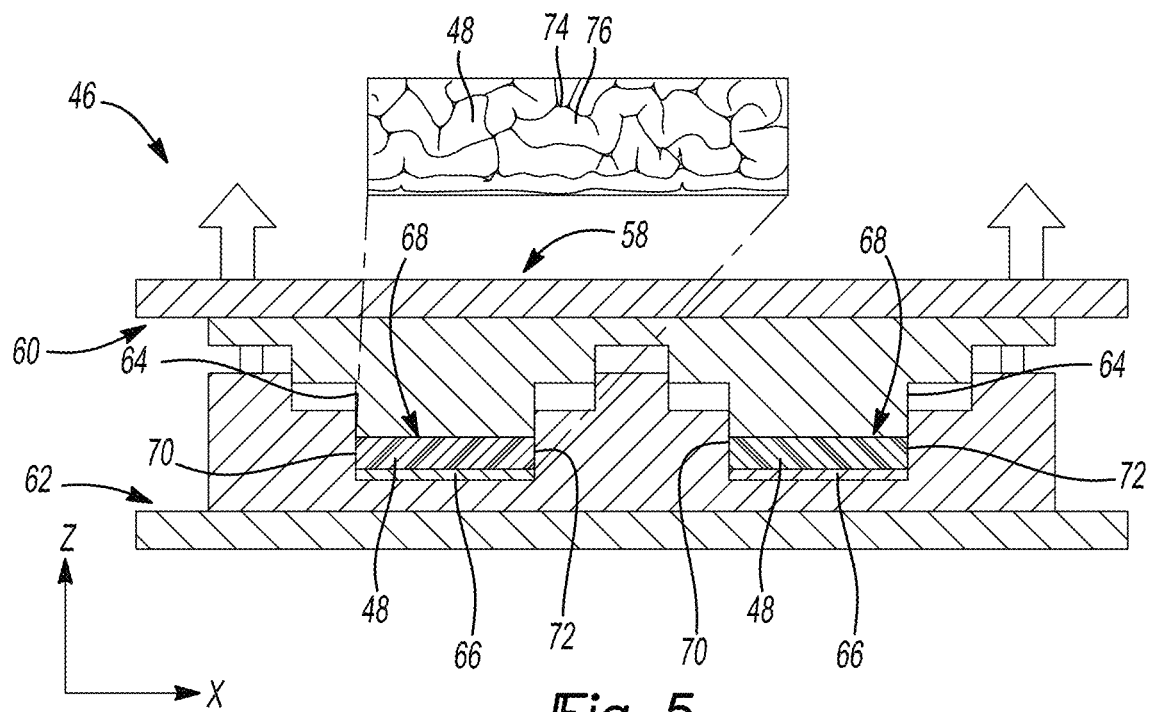
FIG. 5 is a schematic representation of the mold of FIG. 3 in a third position.

The method 40 includes inserting a foam material 48 into a cavity 68 of a mold 58 (FIGS. 3-5). The mold 58 has a top plate 60 and a bottom plate 62, wherein the cavity 68 is defined by the top plate 60 and the bottom plate 62 along with sidewalls extending between the top plate 60 and the bottom plate 62, as will be described in greater detail below. The method 40 includes heating the foam material 48 to cause the foam material 48 to expand within the cavity 68. As the foam material 48 expands, the top plate 60 moves relative to the bottom plate 62 and the sidewalls. In so doing, expansion of the foam material 48 in a direction along the Z-axis is permitted while expansion along the X-axis and the Y-axis is prevented. While expansion of the foam material along the Z-axis is permitted, such movement is restricted by the foam material 48 contacting the top plate 60. As will be described below, contact between the expanding foam material 48 and the moving top plate 60 causes the foam material 48 to skin and fold over on itself, thereby taking a shape similar to the shapes shown in FIGS. 10A and 10B.

Figure 7A:
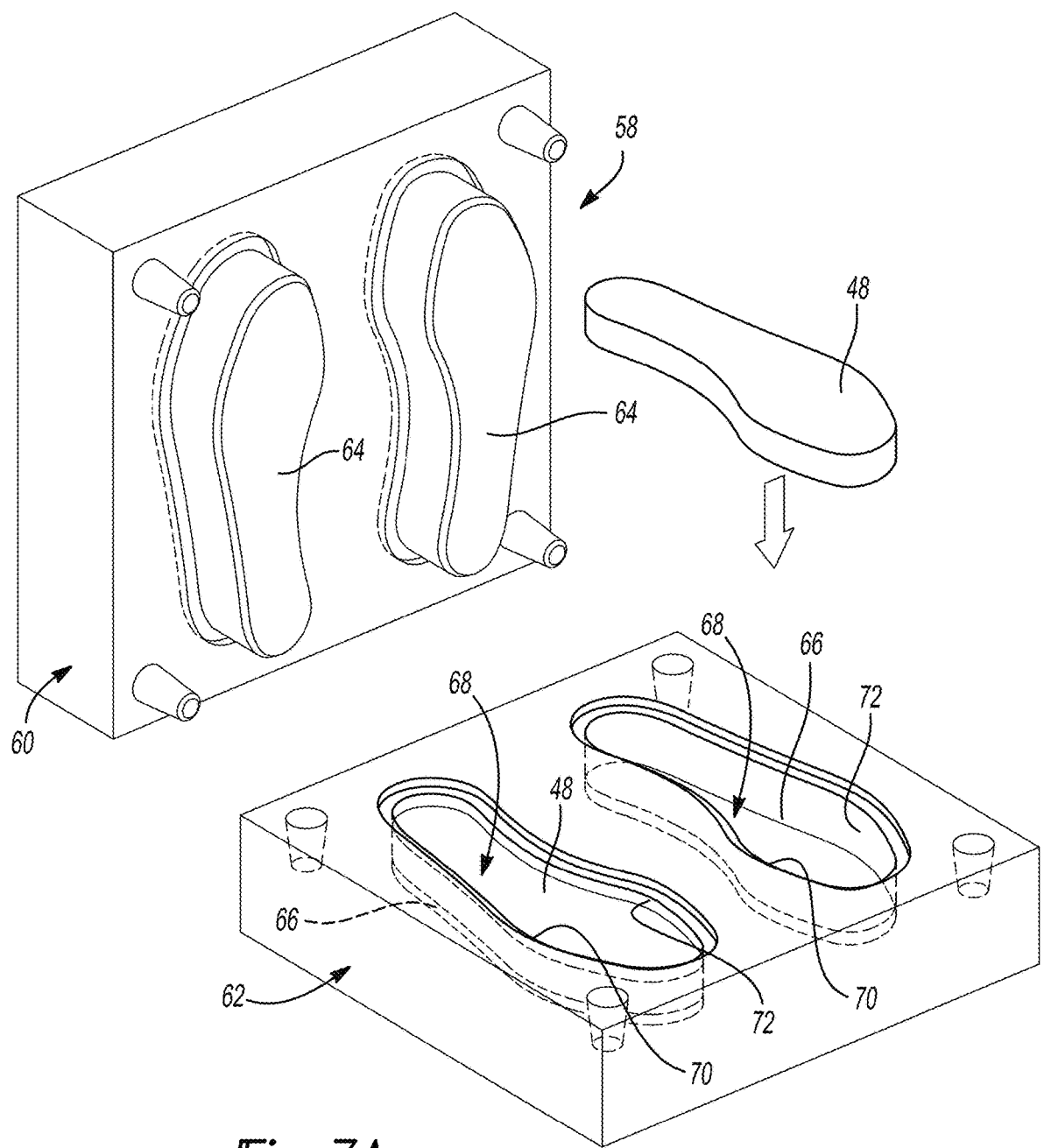
FIG. 7A is a perspective view of the mold of FIG. 6 with one form of foam inserted in the cavity.
Figure 7B:
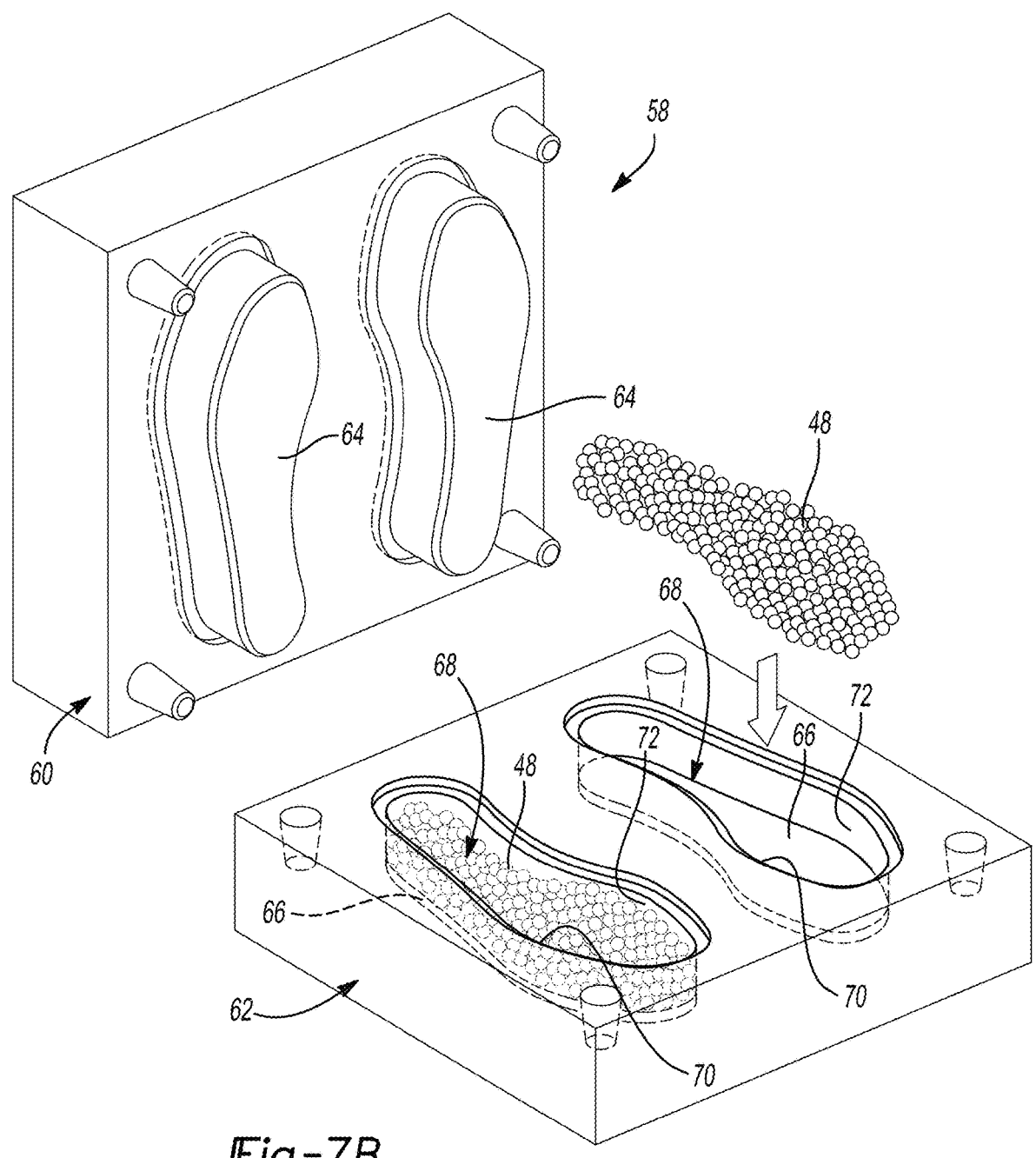
FIG. 7B is a perspective view of the mold of FIG. 6 with another form of foam inserted in the cavity.
Figure 7C:
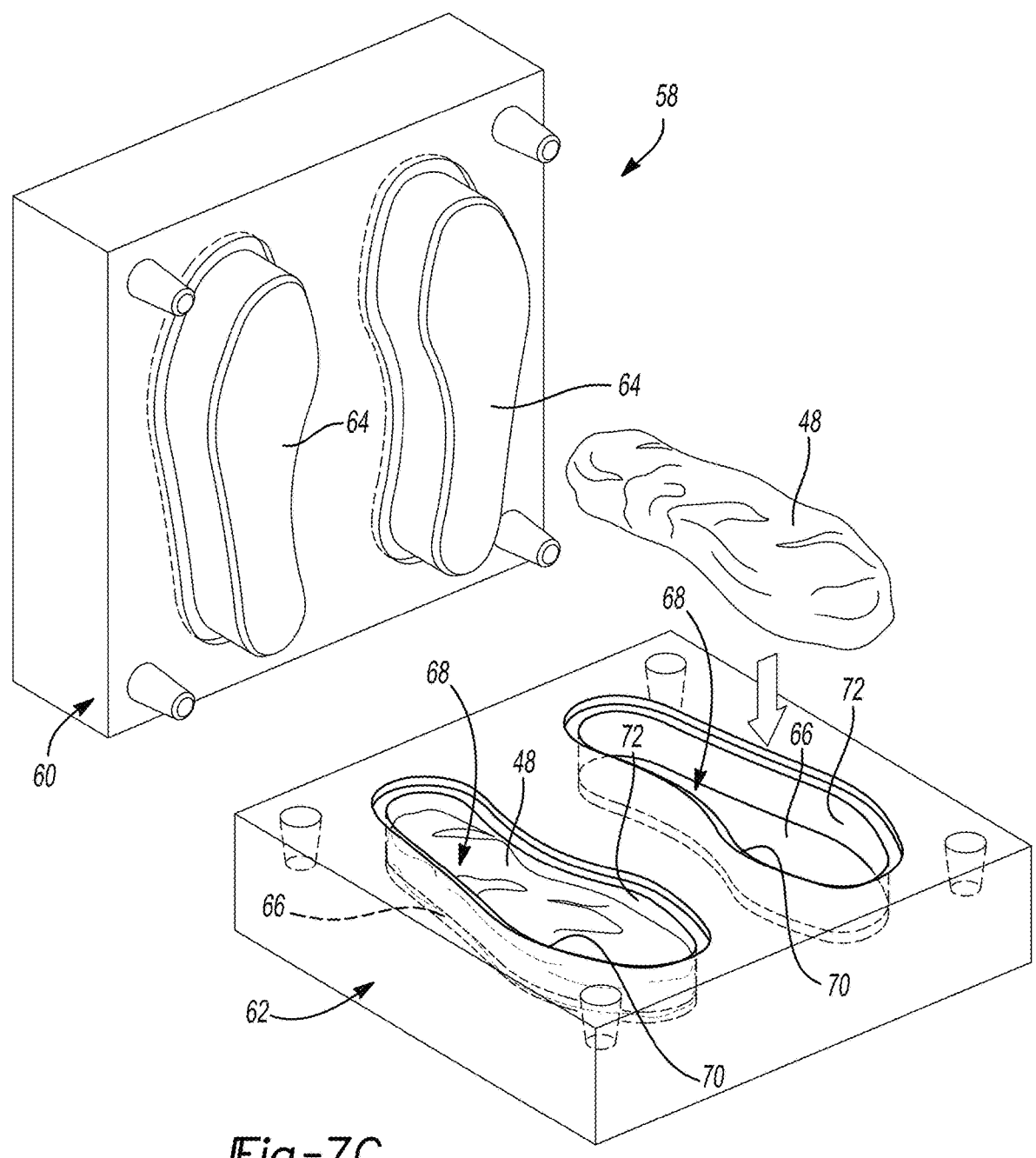
FIG. 7C is a perspective view of the mold of FIG. 6 with yet another form of foam inserted in the cavity.

With particular reference to FIGS. 2-11, the foam material 48 inserted into the cavity 68 of the mold 58 may have a sheet-like shape, as shown in FIG. 7A. Alternatively, the foam material 48 inserted into the cavity 68 of the mold 58 may take the form of a plurality of pellets, as shown in FIG. 7B. Alternatively, the foam material 48 may be injected into the cavity 68 as a liquid material, as shown in FIG. 7C. The foam material 48 may be of any suitable type, such as, for example, non-contactable phylon foam, contactable phylon foam, non-contactable injection foam, contactable injection foam, etc. The foam material 48 may be formed of any suitable material, such as, for example, ethyl vinyl acetate (EVA), polyethylene (PE), styrene butadiene rubber (SBR), polyurethane (PU), latex, neoprene, etc.

The foam material 48 may have an expansion ratio (ER) that is defined as a ratio between a thickness of the foam material 48 initially inserted into the cavity 68 and a thickness of the foam material 48 after curing. The foam material 48 initially inserted into the cavity 68 may be referred to as a preform while the foam material 48 after curing may be referred to as a final or formed component. The thickness of the preform of the foam material 48 may be between approximately 0.5 mm and 3.5 mm. In one configuration, the thickness of the preform of the foam material 48 is approximately 2 mm. The thickness of the formed component of the foam material 48 may be between approximately 8.5 mm and 11.5 mm. In one configuration, the thickness of the formed component of the foam material 48 may be approximately 10 mm. The ER may range from approximately 1 to 5. In one configuration, the ER may range from approximately 1.65 to 1.75. The ER may be inversely correlated with the thickness of the preform of the foam material 48 (i.e., as the thickness of the preform of the foam material 48 increases, the ER may decrease). For example, the ER may be between approximately 1.65 and 1.75 based on a preform having a thickness of approximately 2 mm but would be changed to approximately 1.78 if the preform thickness is reduced from approximately 2 mm to approximately 1.8 mm.

With reference to FIGS. 3-5, the mold 58 may be placed at a first position 42 (FIG. 3), a second position 44 (FIG. 4), and a third position 46 (FIG. 5) and includes the top plate 60 and the bottom plate 62 disposed opposite the top plate 60. The top plate 60 may include a core 64 and the bottom plate 62 may include a base 66 opposite the core 64. The bottom plate 62 may include a first side wall 70 and a second side wall 72 opposite the first side wall 70. The base 66 may extend from the first side wall 70 to the second side wall 72. The top plate 60 and the bottom plate 62 define the cavity 68 therebetween. For example, the core 64 of the top plate 60 and the base 66, the first side wall 70, and the second side wall 72 of the bottom plate 62 may define the cavity 68. A width of the base 66 may be defined as the distance from the first side wall 70 to the second side wall 72 on an X-Z plane as shown in FIGS. 3-5. The width of the base 66 may be slightly larger than the width of the core 64. For example, the core 64 may abut the side walls 70, 72 at the second position 44 and the third position 46 of the mold 58. The mold 58 may be formed of any suitable material, such as, for example, steel, aluminum, etc.

In operation, the preform of the foam material 48 may be inserted into the cavity 68 when the mold 58 is in the first position 42. At this point, the mold 58 may be closed by moving the top plate 60 toward the bottom plate 62. Once closed, the preform of the foam material 48 may be heated within the cavity 68 formed between the top plate 60 and the bottom plate 62. The preform of the foam material 48 may expand within the cavity 68 when the mold 58 is in the second position 44. When the preform begins to expand, the mold 58 may move toward the third position 46 by moving the top plate 60 in a direction away from the bottom plate 62. In so doing, the foam material 48 is permitted to expand in a direction along the Z-axis and contact the top plate 60, as the top plate 60 moves in a direction away from the bottom plate 62. As described above, expansion of the foam material 48 in a direction along the Z-axis causes the foam material 48 to contact the top plate 60 and begin to fold, as schematically shown in FIG. 9. Contact between the foam material 48 and the top plate 60 causes the foam material 48 to fold over on itself, thereby forming a foam component having the structure shown in FIGS. 10A and 10B and as schematically illustrated in FIG. 5. At some point, movement of the top plate 60 in the direction along the Z-axis and away from the bottom plate 62 may be stopped and further expansion of the foam material 48 in the direction along the Z-axis is prevented.

Movement of the top plate 60 relative to the bottom plate 62 along the Z-axis—as the foam material 48 expands—causes voids 74 to form in the material volume. A skin forms in the voids 74 and the voids 74 subsequently collapse. As the foam material 48 cures, the resulting foam structure is defined by irregular folds 76 of the foam material 48. For example, the irregular folds 76 of the foam material 48 may be non-uniform relative to one another. That is, each of the irregular folds 76 may have a shape different than a shape of another of the irregular folds 76.

Forming a component such as a midsole for an article of footwear from the foam material 48 where the foam material 48 takes the shape and configuration shown in FIG. 10A or 10B provides the component with a lower stiffness but substantially the same resilience or compressive strength as compared to a conventionally foamed component (i.e., formed from the prior art process of FIG. 1) even when the same material is used. Further, forming the component from the foam material 48 within the mold 58, as described above and as shown in FIGS. 3-5, allows the component to be formed into a net shape within the mold such that further expansion of the component outside of the mold 58 is not required. In short, the component formed using the in-mold process described above produces a component having a net shape upon removal of the component from the mold 58.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for making a foam component, the method comprising:
    inserting a foam material into a cavity of a mold having a top plate and a bottom plate, the cavity including a Z-axis defined between the top plate and the bottom plate;
    heating the foam material to cause the foam material to expand along a direction of the Z-axis at a first rate; and
    moving one of the top plate and the bottom plate relative to the other of the top plate and the bottom plate along the direction of the Z-axis at a second rate that is less than the first rate as the foam material expands and contacts the one of the top plate and the bottom plate to cause (i) the foam material to skin and (ii) a plurality of irregular folds to form in the skin of the foam material within the cavity and form a formed component.

2. The method of claim 1, wherein inserting a foam material into the cavity includes inserting at least one of a foam sheet, foam pellets, and liquid foam.

3. The method of claim 1, wherein inserting a foam material into the cavity includes inserting a preform of the foam material having a thickness between 0.5 mm and 3.5 mm.

4. The method of claim 3, wherein inserting a foam material into the cavity includes inserting a preform of the foam material having a thickness of 2 mm.

5. The method of claim 1, wherein the formed component is one of an outsole, a midsole, and an insole of an article of footwear.

6. The method of claim 1, wherein expanding the foam material to form a formed component includes forming a formed component having a thickness between 8.5 mm and 11.5 mm.

7. The method of claim 1, wherein expanding the foam material to form a formed component includes forming a formed component having a thickness of 10 mm.

8. The method of claim 1, further comprising utilizing an expansion ratio between 1 and 5.

9. The method of claim 1, further comprising utilizing an expansion ratio between 1.65 and 1.75.

10. The method of claim 1, wherein the top plate is moved relative to the bottom plate as the foam material expands and contacts the top plate to cause the foam material to fold over on itself within the cavity and form a formed component.

11. A method for making a foam component, the method comprising:
    inserting a foam material into a cavity of a mold having a top plate and a bottom plate, the cavity including a Z-axis defined between the top plate and the bottom plate;
    heating the foam material to cause the foam material to expand along a direction of the Z-axis;
    during heating, moving one of the top plate and the bottom plate along the direction of the Z-axis at a restricted rate relative to the other of the top plate and the bottom plate as the foam material expands to form a skin having a plurality of folds; and
    curing the foam material to define a formed component including the plurality of folds in the skin of the formed component, the plurality of folds being substantially non-uniform relative to one another.

12. The method of claim 11, wherein inserting a foam material into the cavity includes inserting at least one of a foam sheet, foam pellets, and liquid foam.

13. The method of claim 11, wherein inserting a foam material into the cavity includes inserting a preform of the foam material having a thickness between 0.5 mm and 3.5 mm.

14. The method of claim 13, wherein inserting a foam material into the cavity includes inserting a preform of the foam material having a thickness of 2 mm.

15. The method of claim 11, wherein the formed component is one of an outsole, a midsole, and an insole of an article of footwear.

16. The method of claim 11, wherein expanding the foam material to form a formed component includes forming a formed component having a thickness between 8.5 mm and 11.5 mm.

17. The method of claim 11, wherein expanding the foam material to form a formed component includes forming a formed component having a thickness of 10 mm.

18. The method of claim 11, further comprising utilizing an expansion ratio between 1 and 5.

19. The method of claim 11, further comprising utilizing an expansion ratio between 1.65 and 1.75.

20. The method of claim 11, wherein moving one of the top plate and the bottom plate relative to the other of the top plate and the bottom plate as the foam material expands includes contacting the one of the top plate and the bottom plate with the foam material to cause the foam material to fold over on itself within the cavity and form the formed component.

* * * * *